METHOD OF MANUFACTURING MAGNETIC HEADS USING A JIG FOR ACCURATELY DETERMINING GAP HEIGHT

Filed March 5, 1962

INVENTOR
SIMON DUINKER
BY Frank R. Jifari
AGENT

United States Patent Office 3,302,268
Patented Feb. 7, 1967

3,302,268

METHOD OF MANUFACTURING MAGNETIC HEADS USING A JIG FOR ACCURATELY DETERMINING GAP HEIGHT

Simon Duinker, Eindhoven, Netherlands, assignor to North American Philips Company, Inc., New York, N.Y., a corporation of Delaware Filed Mar. 5, 1962, Ser. No. 177,453
Claims priority, application Netherlands, Mar. 22, 1961, 262,703
9 Claims. (Cl. 29—155.5)

This invention relates to a method of manufacturing magnetic recording and reproducing heads, in particular heads of the type in which the pole pieces are separated from one another by an extremely narrow gap filled with a non-magnetic bonding agent. In such heads, the gap height and the radius of curvature of the generally cylindrical surface facing the magnetic carrier must be made within very close tolerances.

Magnetic recording and reproducing heads generally comprise a so-called frontal part including pole pieces which may be made of ferrite and an adjoining rear part of magnetically soft material; windings are slipped on the frontal part or on the rear part before these parts are united to form the head.

In the usual method of manufacturing the heads, a certain amount of material is removed from the front surface by grinding. Therefore, the initial gap height is made such that, after material is removed by grinding, the height of gap remaining is the desired one for the correctly functioning head. There are, among others, two drawbacks to this method: first, the height can only be checked indirectly, for example, by measuring an inductance value, thus providing possibly unreliable information about the gap height; and second, the complete head may have to be rejected due to defects or excessive dimensional inaccuracies in the gap or the pole face.

It is a principal object of the present invention to provide an improved method of manufacturing magnetic recording and/or reproducing heads for providing a reliably dimensioned functioning head which does not suffer from the above-noted drawbacks of the prior art methods.

In accordance with one aspect of the invention, the following process for shaping the pole pieces of the frontal part is employed: An assembly of two plates is provided which are ground flat and kept together by an adhesive, the assembly being given a pole face of the desired outline; subsequently the assembly is arranged in a suitably shaped jig, and then there is removed by grinding or the like, from the adjoining parts of the plates protruding from the jig, an amount of material such that the remaining gap has the desired correct height for the functioning magnetic head.

Thus in the process of shaping and subsequently polishing the pole face of the heads, all attention can now be paid to this outline, for example to the required radius of curvature of the generally cylindrical pole face and to the height and the quality of the gap in this face; therefore, the number of rejects due to inaccuracies in these dimensions can be cut down.

When the gap is ground to the correct height it need only be ensured that the grinding tool used approaches the base of the jig so as to be spaced therefrom by a distance equal to the desired gap height.

In addition, the gap height and the magnetic properties of the frontal portion may now be checked before the rear portion is united to the frontal portion; thus, if the relevant dimensions are found not to be within the required tolerances, only the frontal portion need be rejected.

In order that the invention may be readily carried into effect, various embodiments thereof will now be described, by way of example, with reference to the accompanying diagrammatic drawings, in which.

Figures 1, 3:
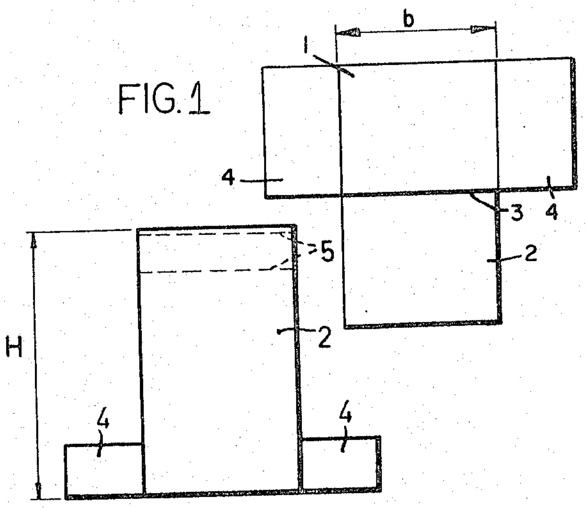
FIGS. 1, 2 and 3 are a plan view, a side elevation and a front elevation respectively of two flat plates of ferrite, secured together, from which the pole pieces are to be made.
Figure 2:
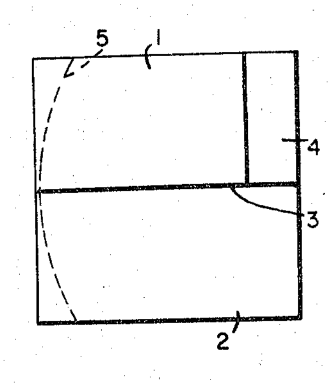

Referring now to the figures, the two plates 1 and 2 from which the frontal portion is to be made and which generally consist of sintered oxidic ferromagnetic material (ferrite) are ground truly flat and are then polished and secured together with the interposition of a thin layer 3 of an adhesive, for example, glass or solder. The plate 1, when placed over the plate 2, slightly protrudes on either side of the latter; however, for the greater part of its length it is given, together with the plate 2, a width $b$ which is approximately equal to the width of the track on which appear the signals to be recorded or reproduced. The protruding parts 4 of the plate 1 serve a purpose to be described hereinafter. By grinding and polishing, the assembled plates are shaped at the side of the future pole face into a generally cylindrical outline shown by broken lines 5 in FIGS. 2 and 3. The dimensional tolerance of the radius of curvature of this outline is small with respect to the required degree of accuracy with which the pole face of the head has to fit within the jig.

Figure 4:
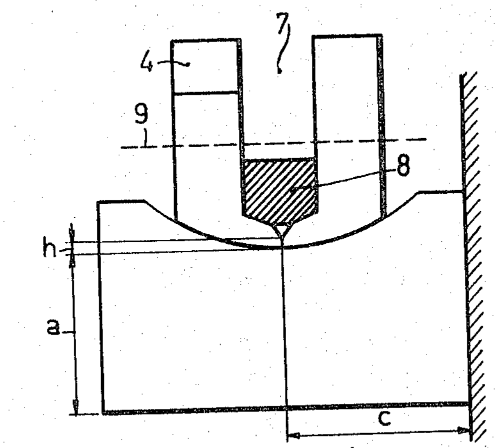
FIG. 4 shows the plates with their specially shaped pole face arranged in a jig after the inner material of the plates has been removed by grinding to bring the gap height to the correct value.
Figure 5:
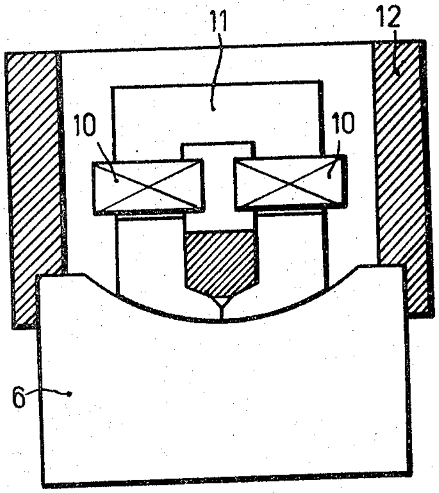
FIG. 5 shows the united frontal and rear portions in the jig surrounded by an encapsulating sheath.

When the pole face has been ground and polished and the accuracy of the radius of curvature and of the length of the gap have been checked, the plates are arranged, with the pole face lowermost in the manner shown in FIGS. 4 and 5, in a jig 6 the cylindrical upper surface of which has substantially the same radius of curvature as the pole face of the head. The plates are firmly secured to the jig with the aid of a thin layer of glue or other adhesive which may be provided by spraying. The dimensions $a$ and $c$ shown in FIG. 4 of this jig, which on one side is urged to a stationary support, are critical, while the dimension at right angles to the plane of the drawing is equal to the above-mentioned width $b$ of the track including the signals to be recorded or reproduced by the head. By bringing the protruding parts 4 of the plate 1 into engagement with a correctly located vertical ruler (not shown) it can be ensured that the gap 3 between the plates is exactly at right angles to the center of the base of the jig 6.

The plates are fixed in the jig in this position and a downwardly conically tapering piece of material is removed from the facing surfaces of the plates so that a downwardly tapering slit 7 is produced. This can be done by means of a milling cutter, a grinding wheel or a similar tool which is capable of accurately defined movement in the plane of the gap. The greater part of this material can be removed by grinding with a coarse wheel but the final part has to be removed carefully with the aid of a small wheel or similar tool operating exactly in the plane of the gap until the bottom of the slit is spaced from the base of the jig by a distance equal to $a+h$, where $h$ is the desired gap height (FIG. 4). This gap height may be about 0.1 mm. with a tolerance of 10%.

A reinforcing member 8 of non-magnetic material is then inserted in the slit 7 and finally the protruding legs of the frontal portion are cut off along a broken line 9 so that two matching surfaces are produced to which the legs of the rear portion can be fittingly joined.

In FIG. 5, windings 10 are slipped onto legs of a rear portion 11. The joined head parts are now firmly secured together by means of sealing resin with the aid of an encapsulating sheath 12 fitting on the jig. After the resin has solidified, the sheath and the jig can be removed and the head is then complete.

Figure 6:
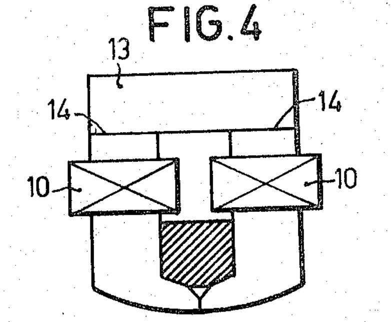
FIG. 6 shows a modified embodiment in which the windings are slipped on the limbs of the frontal portion.

It is alternatively possible and under certain conditions offers advantages to provide the windings 10 not on the legs of the rear portion but on those of the frontal one, and for this purpose the latter legs obviously have to be cut off at a level slightly higher than is shown in FIGS. 4 and 5. It has been found that the efficiency of magnetic heads is improved by providing the windings between the gap and the butt means between the front and rear portions. In this case, the rear portion need not be U-shaped but may simply comprise a straight cross-piece 13 arranged on the edges 14, as is shown in FIG. 6. In order to manufacture a multiple head in accordance with the principle of the invention, one may start from correspondingly wider plates 1 and 2 which are cut so that in the stage shown in FIG. 3 the workpiece comprises at least two aligned assemblies connected to one another by the intermediate projecting parts 4. The length of these projecting parts then is no longer immaterial but must be chosen so that the individual heads are spaced by the desired track spacings and are embedded in sealing resin in the jig while so spaced.

Before the two ferrite plates 1 and 2 and the interposed film of adhesive are united to form an assembly, it may be of advantage to remove part of the edge of one of the plates to a small depth of, for example, 0.1 mm. in the area in which in a later stage the wide part of the slit 7 will be situated. In this manner, the area of this plate to be polished is appreciably reduced thus rendering the polishing operation cheaper; also, during the final shaping of the slit 7 a guiding slit is available for the thin grinding wheel (thickness from 0.1 to 0.15 mm.) therefore rendering this wheel less likely to wobble.

Figure 7:
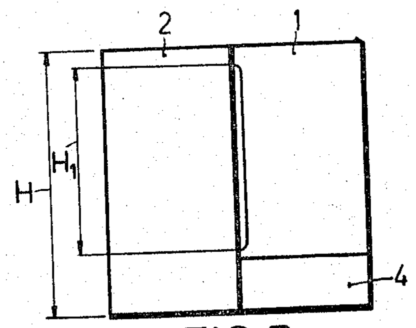
FIG. 7 shows one manner of preparing one of the two plates.

FIG. 7 illustrates this and shows two ferrite plates 1 and 2 secured together, the plate 1 being provided with a shallow depression of length $H_1$ prior to the securing operation. Obviously this length has to be smaller than the overall height H of the plates in the stage shown in FIG. 3.

Various adaptations and modifications may be made without departing from the spirit and scope of the invention as defined in the appended claims.

What is claimed is:

1. A method of manufacturing magnetic recording and/or reproducing heads having a frontal portion including pole pieces and an adjoining rear position, comprising: securing together two flat ferrite plates with a non-magnetic bonding agent, thereby forming a pole piece assembly with the bonding agent forming the future gap of the head, grinding one end of said assembly substantially to the required shape of the pole face, placing said assembly in a jig having a mating surface which conforms in shape to said pole face and a base surface located a distance *a* from the lowermost portion of said mating surface, said one end being placed against said mating surface, and removing sufficient material including a portion of said plates and said bonding agent from said assembly to allow the height of gap remaining to be the desired amount, the removal operation being performed in the portion of said assembly including the bonding agent such that there remains a pair of protruding legs of magnetic material.

2. A method as claimed in claim 1 wherein, after said material is removed, electrical windings are placed on a rear portion of magnetic material which is then joined to said protruding legs.

3. A method as claimed in claim 1 wherein, after said material is removed, electrical windings are placed on the protruding legs of said front portion and a rear portion of magnetic material is placed on said legs.

4. A method of manufacturing magnetic recording and/or reproducing heads having a frontal portion including pole pieces and an adjoining rear portion, comprising: securing together two flat ferrite plates with a non-magnetic bonding agent, thereby forming a pole piece assembly with the bonding agent forming the future gap of the head, grinding one end of said assembly substantially to the required shape of the pole face, placing said assembly in a jig with the interposition of an adhesive, said jig having a mating surface which conforms in shape to said pole face and a base surface located a distance *a* from the lowermost portion of said mating surface, said one end being placed against said mating surface, and grinding away a sufficient amount of material including a portion of said plates and said bonding agent from said assembly to allow the height of gap remaining to be the desired amount, the removal operation being performed in the portion of said assembly including the bonding agent such that there remains a pair of protruding legs of ferrite material, the distance from the base surface to the point of said assembly which is closest to said mating surface being equal to *a* plus the gap height.

5. A method of manufacturing magnetic recording and/or reproducing heads having a frontal portion including pole pieces and an adjoining rear portion, comprising: grinding a shallow depression over a substantial portion of the surface of a flat ferrite plate, securing together said plate and another substantially rectangular flat ferrite plate with a non-magnetic bonding agent, thereby forming a pole piece assembly with the bonding agent forming the future gap of the head, grinding one end of said assembly substantially to the required shape of the pole face, placing said assembly in a jig with the interposition of an adhesive, said jig having a mating surface which conforms in shape to said pole face and a base surface located a distance *a* from the lowermost portion of said mating surface, said one end being placed against said mating surface, and removing a sufficient amount of material including part of said plates and said bonding agent from said assembly to allow the height of gap remaining to be the desired amount, the removal operation being performed in the portion of said assembly including the bonding agent such that there remains a pair of protruding legs of ferrite material, the distance from the base surface to the point of said assembly which is closest to said mating surface being equal to *a* plus the gap height.

6. A method as claimed in claim 5 wherein, after said material is removed, electrical windings are placed on a rear portion of ferrite material which is then joined to said frontal portion.

7. A method as claimed in claim 5 wherein, after said material is removed, electrical windings are placed on the protruding legs of said front portion and a rear portion of ferrite material is placed on said legs.

8. A method of manufacturing a magnetic transducer having a frontal portion including pole pieces and an adjoining rear portion, comprising: securing two flat ferrite plates with a non-magnetic bonding agent, thereby forming a pole piece assembly with the bonding agent forming the future gap of the head, grinding one end of said assembly substantially to the required shape of the pole face, placing said assembly in a jig with the interposition of an adhesive, said jig having a mating surface conforming in shape to said pole face and a base surface located a distance *a* from the lowermost portion of said mating surface, said one end being placed against said mating surface, removing a sufficient amount of material including a portion of said plates and said bonding agent from said assembly to allow the height of gap remaining to be the desired amount, the removal operation being performed in the vicinity of said assembly including the bonding agent such that there remains a pair of protruding legs of ferrite material, and placing a reinforcing member of non-magnetic material between said protruding legs, the distance from the base surface to the point of said assembly which is closest to said mating surface being equal to *a* plus the gap height.

9. A method of manufacturing a magnetic transducer having a frontal portion including pole pieces and an adjoining rear portion, comprising: securing two flat ferrite plates with a non-magnetic bonding agent, thereby forming a pole piece assembly with the bonding agent forming the future gap of the head, grinding one end of said assembly substantially to the required shape of the pole face, placing said assembly in a jig with the interposition of an adhesive, said jig having a mating surface conforming in shape to said pole face, said one end being placed against said mating surface, removing a sufficient amount of material including a portion of said plates and said bonding agent from said assembly to allow the height of gap remaining to be the desired amount, the removal operation being performed in the portion of said assembly including the bonding agent such that there remains a pair of protruding legs of ferrite material, placing a reinforcing member of non-magnetic material between said protruding legs, placing electrical windings on a rear portion of ferrite material, placing said rear portion on said legs, placing an encapsulating sheath enclosing the transducer on said jig, filling the enclosed space with resin, allowing the resin to solidify, and removing the sheath and the jig.

References Cited by the Examiner

UNITED STATES PATENTS

| | | | |
|---|---|---|---|
| 2,240,685 | 5/1941 | Bond | 90—59.8 X |
| 2,585,287 | 2/1962 | Turner et al. | 51—216.2 |
| 2,662,120 | 12/1953 | Anderson | 179—100.2 |
| 2,748,548 | 6/1956 | Hilsinger | 51—216.2 |
| 2,855,644 | 10/1958 | Griffith et al. | 29—455 |
| 2,988,809 | 6/1961 | Hall | 29—455 |
| 3,024,318 | 3/1962 | Duinker et al. | 179—100.2 |
| 3,145,452 | 8/1964 | Camras | 179—100.2 |

FOREIGN PATENTS

| | | |
|---|---|---|
| 718,592 | 3/1942 | Germany. |

JOHN F. CAMPBELL, *Primary Examiner.*

WHITMORE A. WILTZ, *Examiner.*

C. I. SHERMAN, R. W. CHURCH, *Assistant Examiners.*